US 6,437,878 B1

(12) United States Patent
Hansen et al.

(10) Patent No.: US 6,437,878 B1
(45) Date of Patent: Aug. 20, 2002

(54) INTERACTIVE HARDCOPY RE-SAMPLING WITHOUT RE-SCANNING

(75) Inventors: David R. Hansen, Honeoye Falls; Jennifer S. DeYoung, Fairport; Michael D. Swinarski, Batavia, all of NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/572,478

(22) Filed: May 17, 2000

(51) Int. Cl.[7] .............................. H04N 1/04; H04N 1/21; H04N 1/40; G06K 15/02
(52) U.S. Cl. ........................ 358/2.1; 358/442; 358/444; 358/471; 358/474
(58) Field of Search ......................... 358/1.9, 453, 462, 358/448, 471, 474, 444, 442; 382/282, 176

(56) References Cited

U.S. PATENT DOCUMENTS

| 4,760,463 A | * | 7/1988 | Nonoyama et al. ......... 358/452 |
| 5,699,494 A | | 12/1997 | Colbert et al. |
| 5,946,461 A | | 8/1999 | Landry et al. |
| 6,021,221 A | * | 2/2000 | Takaha ........................ 382/199 |
| 6,026,258 A | | 2/2000 | Fresk et al. |

OTHER PUBLICATIONS

Manual, Adobe® "Portable Document Formal Reference Manual, Version 1.3," pp. 2–518.
"Adobe® Acrobat 4.0 Guide," pp. 1–595.
Brochure, "Quite Imposing Plus Online Guide 1.2."
Brochure, "W3C Extensible Markup Language (SML) 1.0," W3C Recommendation Feb. 10, 1998, pp. 1–32.
Brochure, "StampPDF™ Users Guide—An Acrobat Plugin," pp. 6–82, © 1999 Digital Applications, Inc.
Brochure, "TIFF™ Revision 6.0" Specification, pp. 4–120.
Manual, "TWAIN Specification Version 1.8," pp. 1–516.
Manual, "Open Document Management API, Version 2.0," pp. 1–87.
Brochure Guide, "Network Imaging System Interface Development Guide, Release 2," pp. 1–1–6–4.
Dan Phelps and John Thompson, "Rendering For Electronic Printers and Copiers," pp. 1–72.
Kodak Publication No. FN9074 5/85—"Fundamentals of Digital Copiers—Revision 1," pp. 1–49.
U.S. patent application, Ser. No. 09/572,259, filed May 17, 2000.
U.S. patent application, Ser. No. 09/572,101, filed May 17, 2000.
U.S. patent application, Ser. No. 09/572,416, filed May 17, 2000.
U.S. patent application, Ser. No. 09/573,138, filed May 17, 2000.

(List continued on next page.)

Primary Examiner—Scott Rogers

(57) ABSTRACT

A method and system are provided for scanning a page having different image attributes on different zones of the page. The method and system use a scanner having a resident image buffer and scanning circuitry including a plurality of scanning algorithms having optimum rendering characteristics for imaging images with a plurality of different image attributes. The scanner scans the page and an image of the page is provided on a display. The operator uses an input device to designate a zone of said page on said display. The data from said scanned page is stored in a buffer resident on said scanner prior to rendering of said data. The operator also designates a selected one of said algorithms to be applied to the designated zone. The scanner applies the designated algorithm to the data stored in the resident image buffer for the designated zone. The scanner renders an image of the data stored in the resident image buffer.

14 Claims, 1 Drawing Sheet

OTHER PUBLICATIONS

U.S. patent application, Ser. No. 09/573,368, filed May 17, 2000.
U.S. patent application, Ser. No. 09/573,026, filed May 17, 2000.
U.S. patent application, Ser. No. 09/572,108, filed May 17, 2000.
U.S. patent application, Ser. No. 09/572,341, filed May 17, 2000.
U.S. patent application, Ser. No. 09/573,093, filed May 17, 2000.
U.S. patent application, Ser. No. 09/573,113, filed May 17, 2000.
U.S. patent application, Ser. No. 09/572,420, filed May 17, 2000.

* cited by examiner

INTERACTIVE HARDCOPY RE-SAMPLING WITHOUT RE-SCANNING

BACKGROUND OF THE INVENTION

High volume, finished production of documents is typically referred to as production printing. A production printer is a printing device capable of rapid production of large volumes of documents. Typically these printers have high paper handling capacity, the ability to draw on multiple media types from multiple sources and the ability to automatically finish a document such as by adding a binding. Despite the automation provided by the production printer and the proliferation of computer technology, especially in the area of desktop publishing, production printing is still a complicated and often manual process.

Production printing also involves other complicated processes, which affect the production efficiency. For example, in print shops that handle jobs electronically, job submission requires entering the job into the shops electronic production system. For documents that are brought in by the customer as hard copy, the documents must first be scanned electronically into the shop's computer system. Such documents are usually scanned using a production scanner. Further details of the workflow for production printing are described in co-pending U.S. patent application Ser. No. 09/573,113 entitled "Automated Job Creation For Job Preparation", filed concurrently herewith, which is incorporated herein by reference.

In the normal scan operation for production scanning, a large stack of originals is placed in an input hopper of a production scanner device. The operator then sets a few attributes for the scanner, which defines the nature of the stack of originals, and then activates a start button. The scan is complete when the last sheet is scanned in.

In some cases it is important to take extra care with a few of the pages in the original stack because they contain photograph or image content that should be scanned in with special attributes set. The scanning of these pages usually takes multiple attempts in order to "tweak in" the attributes to obtain the ultimate image quality from these special pages. To support the multiple attempts, scanners will perform multiple scans of the same sheet. However, the sheet may have to be manually placed on the platen for the multiple scans, thus disturbing the original large stack. Alternatively, if the scanner does not have a platen, but only a stream scan device, the sheet must be manually moved back from the output hopper to the input hooper for a subsequent scan.

Also, when there is a complex page of data, for example containing some text, some graphics and a photograph, the operator needs to apply a different scanning algorithm to each of these. Different scanning algorithms are better suited for different tasks. For example, one algorithm may be better suited for scanning text and anther algorithm may be better suite for scanning graphics. This makes an already difficult task of obtaining optimum image quality for a page all of one image type exponentially more difficult.

Some prior art systems have been developed that use different algorithms for different tasks. For example, some available systems attempt to provide these capabilities in software. A software system, however will result in slow production. Further, the software is not tuned for the specific scanner or printer to be used in the process. Another available system sold by Kofax, Inc. is a system called "VirtualReScan". This system attempts to address the software problem by using an external board containing the various algorithms. This system, however, also has the disadvantage that the algorithms on the board are not tuned to a specific scanner or to a printer.

Therefore, it is desirable to provide a scanner with interactive capabilities for scanning documents containing complex page data.

BRIEF SUMMARY OF THE INVENTION

A method and system are provided for scanning a page having different image attributes on different zones of the page. The method and system use a scanner having a resident image buffer and scanning circuitry including a plurality of scanning algorithms having optimum rendering characteristics for imaging images with a plurality of different image attributes. The scanner scans the page and an image of the page is provided on a display. The operator uses an input device to designate a zone of the page on the display. The data from the scanned page is stored in a buffer resident on the scanner prior to rendering of the data. The operator also designates a selected one of said algorithms to be applied to the designated zone. The scanner applies the designated algorithm to the data stored in said resident image buffer for the designated zone. The scanner renders an image of the data stored in the resident image buffer.

DETAILED DESCRIPTION OF THE PRESENTLY PREFERRED EMBODIMENTS

Figure 1:
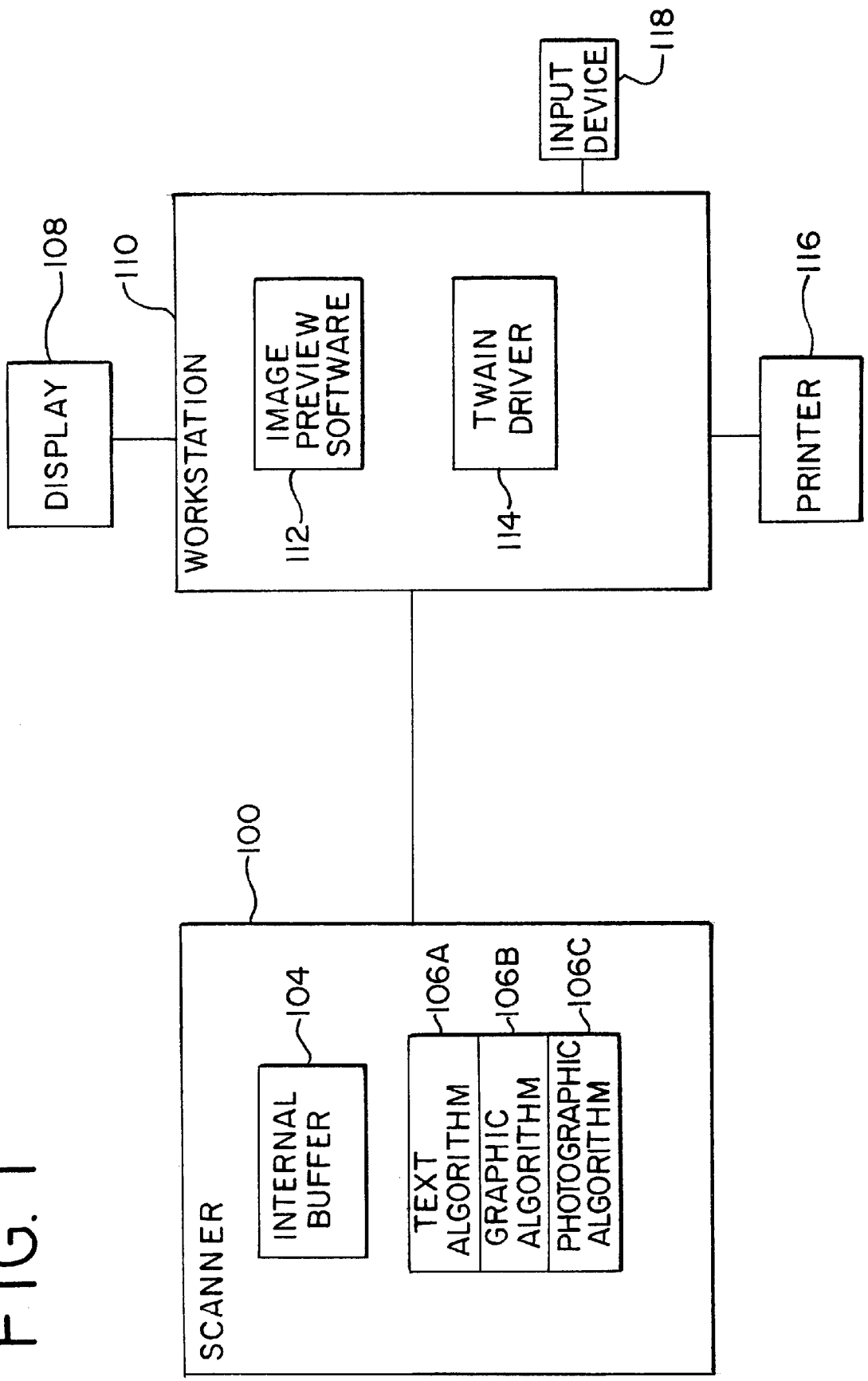
FIG. 1 illustrates a preferred embodiment of the scanning system of the present invention.

Referring now specifically to FIG. 1, a preferred embodiment of the scanning system of the present invention is illustrated. In this embodiment, a scanner 100 is provided and connected to a workstation 110. The scanner 100 includes a buffer which is onboard or resident in the scanner 100. In an embodiment where the scanning resolution is 600×600 dots per inch (dpi), the internal buffer 104 is preferably an 8-bit buffer, i.e., 8 bits of data stored per dot. The scanner also includes scanning circuitry 106 which is comprised of circuitry providing a plurality of scanning algorithms 106A, 106B, and 106C. The scanning circuitry 106A may be, for example, optimized for the scanning of text, the scanning algorithm 106B may be optimized for the scanning of graphics and the scanning algorithm 106C may be optimized for the scanning of photographs. It will be apparent to those skilled in the art that scanning algorithms for other types of page attributes may also be incorporated without departing from the spirit of the invention. Thus, the scanner 106 is specifically provided with algorithms 106A–106C which are optimized for different image attributes (text, graphics, black and white photographs, color photographs, etc.). Each of these algorithms provides optimal image quality for the scanning of the various image attributes.

Connected to the scanner 100 is a workstation 110 which is connected to a display 108 and a printer 116. Also connected to the workstation 110 is an input device 118, such as a keyboard, mouse, trackball or any other suitable input device. The desktop includes a suitable driver for receiving images and interfacing with the workstation 110. For hard copy input via a scanner, a suitable industry standard scanner interfaces, is a TWAIN driver, as defined by the TWAIN group located in Boulder Creek, Calif. Preferably, the workstation 110 also includes software that permits the viewing of an image which is scanned by the scanner 100. A suitable image software package is available as Image Preview software available from Heidelberg Digital, L.L.C., located in Rochester, N.Y. The previous software permits the interactive scanning of the document by an operator.

In operation, a page (document) is placed on the platen of the scanner 100, whether automatically or manually, and the scanner scans the page to generate digital data representing the image. As discussed, the preferred embodiment with 600 dpi the image is stored in an 8-bit buffer. The data is stored in the buffer prior to rendering of the data. That is, the data is stored in 8-bit format, i.e., 256 gradiations per dot or pixel scanned. The operator then uses the preview software 112 to provide an image of the page from the data on the display 108. The image preview software (IPS) 112 provides the image in rendered or 1-bit format and reformats the data so an image can be generated on the display. With the image on the display 108, an operator can preview the page and determine if there are particular zones on a page which require special rendering algorithms. For example, a page may have both text and a photograph on part of the page. The scanning of the photograph would be optimized by using an algorithm particularly suited for photographs while the text will be scanned using a different algorithm particularly optimized for text. The operator can use the input device 118 to designate a zone, such as a window around a particular portion of the page. The operator then uses the input device to designate a particular algorithm which is to be used with the designated zone. Preferably, the zones are viewable on the display 108 through the use of a window. After receiving the appropriate instructions from the workstation, the scanner 100 then obtains the data which is in the 8-bit format in the buffer 104 and applies the designated algorithm to the image in the window or zone designated by the operator.

The rendered image of the page with all of the designated algorithms applied to all of the designated zones on the page is then sent to the workstation and printed on the printer 116. Preferably, the algorithms 106A–106C are tuned specifically for use in the scanner 100, which may have peculiar optical and electronic properties that need to be accounted for. Also, preferably, the scanning algorithms 106A–106C are specifically tuned for a specific tune 116 to provide optimized scanning capabilities.

The system and method of the present invention provide several advantages. Through the use of the scan data buffer 104 present in the scanner of the present invention and the use of the image preview software 112 within the TWAIN driver 114, the manual placement and movement of sheets and the disturbance of the original stack of paper can be avoided when handling the "special pages." In addition, the image preview software 112 allows the ability to identify "zones" on the page that can be scanned with their own image attribute settings without compromising the handling of the sheets.

The operator can "flag" the sheets that need the special scanning by using a keysheet (special sheet detected by the scanner in a stack of originals), placing the sheet on the platen, placing the sheet in the stream feeder, or break up the original stack and place the "subsets" of the original stack in an input stream feeder one at a time until the full stack is scanned in. In the latter case, one subset would be a special sheet that requires the interactive scanning. Once the special sheet has been identified, the scanner 100 is notified so that it scans the page and keeps an 8-bit version of the data in its resident data buffer 104. This data is delivered to the image preview software 112 ("IPS") in a rendered (i.e., 1 bit) form based on the current scan attributes set. The IPS 112 displays the rendered image. The IPS 112 now allows the operator to identify zones on this image, set specific scan attributes for the zone(s) and then request a re-sample of the image according to the appropriate algorithm. The IPS 112 software requests rendered data for each zone (including the background page as on zone) from the scanner's data buffer 104. The IPS 112 constructs the resultant image from the multiple zones and displays this result. The operator can iterate on the currently displayed image and its zones by changing the scan attributes for a zone or adding or deleting zones. Once the best total image is captured, the operator can continue with the remaining scanning of the original stack (which may be another special page). With the system and method of the present connection, the operator does not have to manually move the original sheets as much (or at all) as compared the conventional production scanning systems. The operator can apply special scan attributes to zones within the total page as well as for the page. The scanner device is not mechanically in use for each scan (i.e., re-sample), thus there is no margin for error because the position of the sheet changed with respect to the scanning mechanism.

Further, unlike prior art systems which use software to provide the algorithms which are optimized for different image attributes, the present system provides the different algorithms in circuitry onboard the scanner 110. Thus, the speed of the present invention is much higher than that of such prior art systems. Further, unlike other systems wherein a separate board is provided with the various scanning algorithms, the present invention provides the scanning algorithms directly onboard the scanner. The algorithms which are provided are tuned for the specific scanner. Thus, the scanning is optimized using these tuned algorithms.

Although the embodiment above has been described with respect to a production scanner, it will be recognized by those skilled in the art that the present invention encompasses any scanner that can advantageously use the inventive concepts described herein.

It is therefore intended that the foregoing detailed description be regarded as illustrative rather than limiting, and that it be understood that it is the following claims, including all equivalents, that are intended to define the spirit and scope of this invention.

We claim:

1. A scanning system for scanning a page having different image attributes on different zones of said page, said scanning system comprising:

A) a scanner for scanning a page, said scanner having:
   a resident image buffer;
   scanning circuitry including a plurality of scanning algorithms having optimum rendering characteristics for imaging images with a plurality of different image attributes;
   wherein when an image in a zone is scanned to provide image data, the image data is stored in said resident image buffer prior to rendering of said image data;
   logic for rendering an image of said image data;

B) a workstation having a display, a processor and an input device:
   said processor including logic configured to 1) receive said rendered image data and reformat said data for said display, 2) designate a plurality of zones of said page on said screen identified by said input device, and 3) designate selected algorithms to be applied to said designated plurality of zones identified by said input device based in part on a text, a graphic, and a photographic content of each respective zone of said plurality of zones;

wherein said scanner applies said designated algorithms to each of said designated zones by applying said designated algorithms to said data stored in said resident image buffer for said designated zone.

2. The scanning system of claim 1 wherein said plurality of scanning algorithms comprises at least a text, a graphic, and a photograph algorithm.

3. The scanning system of claim 1 wherein one said plurality of image attributes comprises graphics image data.

4. The scanning system of claim 1 wherein one said plurality of image attributes comprises photograph image data.

5. The scanning system of claim 1 further comprising a printer wherein the plurality of scanning algorithms are tuned to said printer.

6. A method of scanning a page having different image attributes on different zones of said page, said method comprising:

providing a scanner having a resident image buffer and scanning circuitry including a plurality of scanning algorithms having optimum rendering characteristics for imaging images with a plurality of different image attributes;

scanning said page;

providing an image of said page on a display;

designating a plurality of zones of said page on said display;

storing the data from said scanned page in a buffer resident on said scanner prior to rendering of said data;

designating selected algorithms to be applied to said designated plurality of zones based at least in part on a text, a graphic, and a photographic content of each respective zone of said plurality of zones;

applying each of said designated algorithms to said data stored in said resident image buffer such that at least one of said designated algorithms is applied to each of said designated zones;

viewing said data through said display after said designated algorithms are applied to said data stored in said resident image buffer; and rendering an image of said data stored in said resident image buffer.

7. The scanning system of claim 6 wherein one said plurality of image attributes comprises text image data.

8. The scanning system of claim 6 wherein one said plurality of image attributes comprises graphics image data.

9. The scanning system of claim 6 wherein one said plurality of image attributes comprises photograph image data.

10. The method of claim 6 further comprising:

providing a printer to print said image rendered from said data stored in said resident image buffer and tuning said plurality of scanning algorithms to said printer.

11. An interactive re-sampling and scanning system comprising:

an image buffer;

scanning circuitry comprising a text, a graphic, and a photographic scanning algorithm coupled to said image buffer;

scanned image data stored in said image buffer;

logic coupled to said scanning circuitry configured to render an image of said scanned image data;

a TWAIN compliant workstation coupled to said scanning circuitry comprising a display, a protocol, a processor, and an input device;

wherein said protocol is configured to designate said image into a plurality of designated zones in response to an input from said input device, and is further configured to control said scanning circuitry such that said scanning circuitry applies at least one of the text, the graphic, and the photographic scanning algorithms to each of the designated zones by applying said at least one text, graphic, and photographic scanning algorithms to said scanned image data.

12. An interactive re-sampling and scanning system comprising:

an image buffer;

scanning circuitry comprising a text, a graphic, and a photographic scanning algorithm coupled to said image buffer;

scanned image data stored in said image buffer;

logic coupled to said scanning circuitry configured to render an image of said scanned image data;

a TWAIN compliant workstation coupled to said scanning circuitry comprising a display, a protocol, a processor, and an input device;

wherein said protocol is configured to produce an image on said display in a 1-bit format and designate said image produced on said display into a plurality of designated zones in response to an input from said input device, and is further configured to control said scanning circuitry such that said scanning circuitry applies at least one of the text, the graphic, and the photographic scanning algorithms to the designated zones by applying said at least one text, graphic, and photographic scanning algorithms to said scanned image data.

13. The interactive re-sampling and scanning system of claim 12 wherein said scanning circuitry is configured to apply said graphic algorithm to selected scanned image data.

14. The interactive re-sampling and scanning system of claim 12 further comprising hardware coupled to said image buffer and scanning circuitry that receives and transmits data to said TWAIN compliant workstation.

* * * * *